United States Patent Office 3,440,260
Patented Apr. 22, 1969

3,440,260
NOVEL POLYMER INTERMEDIATES
Nathan Mayes, Ironia, N.J., assignor to Thiokol Chemical Corporation, Bristol, Pa., a corporation of Delaware
No Drawing. Filed Sept. 30, 1964, Ser. No. 400,569
Int. Cl. C07f 7/02, 7/08
U.S. Cl. 260—448.2
25 Claims

ABSTRACT OF THE DISCLOSURE

Carborane silanes useful as intermediates in the preparation of thermally stable siloxane carborane of the general formula:

$$A(CH_2)_nZR$$

wherein A is a siloxane radical, Z is a carborane radical and R is a member of the group hydrogen, aryl radicals and aliphatic radicals, and $n$ is an integer including zero.

---

This invention concerns novel boron containing substituted silanes and a process for preparing them.

More particularly this invention relates to the preparation of carborane-silanes useful as polymer intermediates. These compositions are especially valuable because they can be readily polymerized to thermally stable silicone copolymers.

The novel carborane-silane compositions of this invention are included within the formula:

$$A(CH_2)_n ZR^1$$

in which A is a silixane radical selected from the group consisting of: $XSi(R)_2OSi(R)X$, $$XSi(R)_2OSi(R)_2OSi(R)X$$

and $XSi(R)_2OSI(R)_2OSi(R)_2OSi(R)X$, X being selected from the group consisting of chlorine, bromine, and the radicals methoxy, ethoxy and n-butoxy, Z is a carborane radical, R and $R^1$ are members of the group selected from hydrogen, aryl radicals, and aliphatic radicals, preferably aliphatic radicals having from 1–6 carbon atoms, and $n$ is an integer ranging from 0 up to and including 8.

Carborane is the generic term used to describe all the isomers of the clovo-boron-carbon hydride of the empirical formula: $B_{10}C_2H_{12}$.

The term "carboranyl" is the name given to the radical of the ortho carborane isomer shown below:

The ortho isomer is also referred to by the Greek letters theta, abbreviated θ.

The radical of the para isomer of carborane is referred to herein as paracarboranyl.

The radical of the meta isomer of carborane is referred to as "neocarboranyl" abbreviated as ⊕.

With the increased use of high temperature processes and devices there has been a need for polymeric substances which are stable for extended periods of time at temperatures above 200° C. preferably with good dielectric properties and dimensional stability. These resins are especially useful for electrical potting resins and for manufacturing laminated circuit boards. The preparation of intermediates for these thermally stable polymers is therefore a substantial advance in the art.

Thus, it is an object of this invention to prepare a novel group of boron containing substituted silanes.

It is another object of this invention to prepare intermediates for preparing thermally stable resins having good physical and electrical characteristics.

A more specific object of this invention is the preparation of polymeric intermediates having no more than 2 like siloxy units in sequence.

The above objects among others are achieved by preparing the novel intermediates of this invention through the process described below.

In practice an alkylcarborane reactant is contacted with a siloxane reactant having a terminal hydrogen and reactive halogen or alkoxy groups in the presence of a noble metal catalyst.

The preferred process for preparing the intermediate is shown below:

$$R^1Z(CH_2)_aCH=CH_2 + HA \rightarrow R^1Z(CH_2)_aCH_2CH_2A$$

wherein R and $R^1$ are members of the group selected from hydrogen and aliphatic radicals, Z is a carborane, A is a siloxane radical defined earlier on the first page and $a$ is an integer ranging from 0 up to and including 6.

The above reaction is conveniently conducted ordinarily without solvents at temperatures ranging from 10–200° C., preferably at temperatures ranging from 20–50° C. in the presence of a noble metal catalyst until the novel products of this invention are produced.

Preferably the alkylcarborane reactant is added slowly to the stirred heated siloxane reactant in the presence of a catalytic quantity (0.1 to 5% by weight of siloxane reactant) of a noble metal catalyst. However, the converse order of addition is acceptable. The heating is continued for an additional ½–2 hours until the product is formed, in substantial quantities. The product can be isolated and purified using any of the common procedures utilized in organic chemistry including solvent extraction chromatography, distillation and the like. The preferred isolation and purification procedure is fractional distillation under high vacuum to produce the product as a high boiling thermal stable material.

The nobel metal catalyst required for maximum yields are the noble metals or sources of the noble metals used with or without inert supporting materials or matrices. Satisfactory noble metals include osmium, iridium, platinum, palladium, rhodium, ruthenium among others. Platinum or palladium supported on charcoal and the like are the favored catalysts when the free noble metals are utilized, because of lower cost, commercial availability and the good yields that are obtained.

A preferred source of the noble metals are the halonoble metal "acids" such as chloroplatinic acid. When these catalysts are used, no inert support is required since the reagents are liquid in form and can be readily dispersed into the reaction mixture.

The reaction conditions are relatively flexible in most respects. For example, while ordinarily the alkenylcarborane is added to the siloxane, the reverse order is permissible. While no inert solvent is ordinarily employed, the reaction can be carried out in the presence of inert solvents if desired. The ratio of reactants while not critical to the success of the reaction should approach that required by stoichiometry. However, as much as a 25% excess of either reactant can be employed without substantially affecting the success of the reaction.

Because of experimental variables involved such as temperatures, the reactants employed and the like, no precise reaction time can be given. However, experience indicates that most of the reactions will be substantially complete within 1–24 hours with 2–6 hours being a more typical time.

As indicated above the preferred method cannot be used to prepare the siloxane carboranes or siloxane neocarboranes containing less than two methylene ($CH_2$) groups. To prepare these compounds as well as the other compounds of this invention, a less preferred process can be utilized. This process involves the formation of a carborane Grignard reagent RθMgBr (where R is alkyl or H) through the reaction of ethyl magnesium bromide in ether with the carborane (RθH). The Grignard is then reacted in excess ether with an alkoxybromo siloxane such as ROSi(R)₂OSi(R)(Br)OR to form the desired siloxane carborane product.

For example, the carborane product $$CH_3OSi(CH_3)_2OSi(CH_3)(\theta H)OCH_3$$

can be prepared by the above process by reacting 15 parts by weight of the Grignard of carborane with a stoichiometric quantity of the siloxane $$CH_3OSi(CH_3)_2OSi(CH_3)(OCH_3)Br$$

at ether reflux temperature and distilling off the desired product. Alternatively the same product can be made by reacting $CH_3OSi(CH_3)_2OSi(CH_3)(OCH_3)Br$ with the lithio carborane (LiθH). The compounds having but one CH₂ group can be made using the Grignard of monobromomethylcarborane (BrCH₂θH) and the same type of siloxane. Other methods can be used to produce the siloxane carborane products having 0 or one (CH₂) groups but yields are relatively poor or separation problems arise.

The 1-alkenyl carborane reactant used to prepare the carborane monomers of this invention can be prepared by forming a Grignard reagent from a halocarborane and magnesium shavings in ether. The resultant magnesium Grignard reagent is further reacted with a haloalkene to form the intermediate which is then hydrolysed to the desired 1-alkenyl carborane reactant. An illustration of this is the preparation of a 1-alkenyl carborane such as C-(3-butenyl) carborane. This type of compound has a terminal hydrogen off one carbon of the carborane group and the olefin off the other carbon. The above compound can be prepared as follows.

A Grignard reagent is prepared by reacting 25 parts by weight of magnesium shavings with 235 parts by weight of bromomethyl carborane and 2500 ml. of ethyl ether. The reaction mix is cooled to 20° C. and 5 parts by weight of CuCl coupling agent is added to the cooled mixture. Then a solution of allyl bromide (118 parts by weight) in ethyl ether is added dropwise keeping the temperature relatively constant. The mixture is refluxed for seven hours and hydrolysed with a saturated aqueous solution ammonium chloride. The C-(3-butenyl) carborane product is separated from the ether by distillation.

Another type of 1-alkenyl carborane is where the carborane group has an alkyl or aryl substituent off it. An illustration of this is C-(methyl)-C¹ (2-propenyl) carborane which can be prepared by conducting the above reaction with the same reactants in tetrahydrofuran. The product is treated, separated and purified as above.

Another method of making these alkylated or arylated carboranes is to prepare the hydrogen terminated 1-alkenyl carborane monomer in ethyl ether as described previously, then after the alkenyl reactant has been isolated, forming the lithium derivative by replacing the acidic hydrogen on the carborane and reacting the lithio derivative with the desired aryl, alkyl or alkyl-aryl halide. To prepare $C_3H_7\theta CH_2CH_2CH=CH_2$ for example, the Grignard of Hθ—CH₂Br in diethyl ether is prepared and reacted as above with allyl bromide (CH₂=CHCH₂Br) and hydrolysed to HθCH₂CH₂CH=CH₂.

The hydrogen on the carborane is reacted with an alkyl or aryl lithium such as butyl or phenyl lithium to form Liθ—CH₂CH₂CH=CH₂ and this lithio derivative is reacted with n-C₃H₇Br to form $$n-C_3H_7—\theta—CH_2CH_2CH=CH_2$$

the desired product.

The phenyl derivative of the above compound can be made by reacting phenyl bromide rather than propyl bromide with the lithio compound.

The 1-alkenyl neocarborane reactants used to prepare the neocarborane monomers of this invention can be prepared analogously to the methods described for the carboranes. For example, 5-hexenyl neocarborane is prepared by making the Grignard of bromomethyl neocarborane (H⊕CH₂MgBr) in diethyl ether and reacting the resultant reagent with CH₂=CH(CH₂)₃Br, and hydrolysing to form H⊕(CH₂)₄CH=CH₂ product. Purification again is effected by distillation.

The C-phenylethyl derivative (C-phenylethyl-C¹-hexenylneocarborane) of the above compound can be prepared by reacting butyllithium with the C-hydrogen and reacting the C-lithio-C¹-hexenylneocarborane with phenyl ethylbromide.

The chemistry of many of the alkenylcarboranes and the alkenylneocarboranes is also described in Inorganic Chemistry, vol. 2, #6, Dec. 2, 1963, pp. 1089–1133.

The siloxane reactants of this invention are prepared by cohydrolysis of 2 moles of dihalosilanes or a haloalkoxysilane or a mole each of dihalosiloxane and dialkoxysiloxane with the stoichiometric quantity of water in an inert solvent such as dialkylethers. The resulting mixture of products is resolved through fractional distillation in an apparatus having a multi-plate system. The reactant 1,1,3-trimethyl-1,3-dichlorodisiloxane and analogous compounds have been described by K. A. Andrianov et al., Izvest. AKad. SSSR, Otdel Khim, Nauk, 1957, 806–811.

One embodiment of the invention is the preparation of the siloxanecarborane having the formula $$ClSi(C_2H_5)_2OSi(C_2H_5)([CH_2]_5\theta\ phenyl)Cl$$

by slowly adding 15 parts by weight of the alkenylcarborane, CH=CH(CH₂)₃θ-phenyl to a stirred mixture of 13 parts by weight of the siloxane, $$ClSi(C_2H_5)_2OSi(C_2H_5)(H)Cl$$

and 0.2 ml. of a solution of 0.1 g. H₂PtCl₆.6h₂O in 1 ml. of isopropanol at a temperature of about 50° C. After the addition is complete, heat at the same temperature for an additional 2 hours and allow the reaction mixture to cool to room temperature. Fractionate the cooled reaction mixture at about 195° C./0.01 mm. of mercury to produce a relatively pure product. Infrared and elemental analysis can be used to confirm that the desired product is produced.

Another embodiment of the invention is the preparation of the siloxanecarborane having the formula $$BrSi(CH_3)_2OSi(CH_3)([CH_2]_4\theta H)Br$$

by slowly adding 15 parts by weight of the alkenylcarborane, CH₂=CHCH₂CH₂θH to a stirred mixture of 14.5 parts by weight of the siloxane, $$BrSi(CH_3)_2OSi(CH_3)(H)Br$$

and 0.2 ml. of a solution of 0.1 g. H₂PtCl₆·6H₂O in 1 ml. of isopropanol at a temperature of about 40° C. After the addition is complete, heat at the same temperature for an additional one hour and allow the reaction mixture to cool to room temperature. Fractionate the reaction mixture at about 180° C./0.02 mm. of mercury to produce a relatively pure product. Infrared and elemental analysis can be used to confirm that the desired product is produced.

Another embodiment of the invention is the preparation of the siloxanecarborane having the formula $$BrSi(CH_3)_2OSi(CH_3)([CH_2]_6\theta H)Br$$

by slowly adding 15 parts by weight of the alkenylcarborane, CH₂=CH(CH₂)₄θH to a stirred mixture of 14.6 parts by weight of the siloxane, $$BrSi(CH_3)_2OSi(CH_3)(H)Br$$

and 0.2 ml. of a solution of 0.1 g. H₂PtCl₆.6H₂O in 1 ml. of isopropanol at a temperature of about 35° C. After the addition is complete heat at the same temperature for an additional one hour and allow the reaction mixture to cool to room temperature. Fractionate the reaction mixture at about 180° C./0.02 mm. of mercury to produce a relatively pure product. Infrared and elemental analysis can be used to confirm that the desired product is produced.

As indicated earlier the invention in its broadest aspects has many possible embodiments. One embodiment of the invention is the preparation of the siloxane carborane having the formula ClSi(CH$_3$)$_2$OSi(CH$_3$)([CH$_2$]$_4$$\theta$CH$_3$)Cl by slowly adding 15 parts by weight of the alkenylcarborane, CH$_2$=CHCH$_2$CH$_2$$\theta$CH$_3$ to a stirred mixture of 13 parts by weight of the siloxane, ClSi(CH$_3$)$_2$OSi(CH$_3$)(H)Cl and 0.2 ml. of a solution of 0.1 g. H$_2$PtCl$_6$·6H$_2$O in 1 ml. of isopropanol at a temperature of about 45° C. After the addition is complete heat at the same temperature for an additional 2 hours and allow the reaction mixture to cool to room temperature. Fractionate the reaction mixture at about 180° C./0.02 mm. of mercury to produce a relatively pure product. Infrared and elemental analysis can be used to confirm that the desired product is produced.

Another embodiment of the invention is the preparation of the siloxanecarborane having the formula ClSi(n-C$_4$H$_9$)$_2$OSi(n-C$_4$H$_9$) ([CH$_2$]$_3$$\theta$—n-C$_3$H$_7$)Cl by slowly adding 15 parts by weight of the alkenylcarborane, CH$_2$=CHC$_2$$\theta$-nC$_3$H$_7$ to a stirred mixture of 14 parts by weight of the siloxane, ClSi(n-C$_4$H$_9$)$_2$OSi(n-C$_4$H$_8$)(H)(Cl)

and 0.2 ml. of a solution of 0.1 g. H$_2$PtCl$_6$·6H$_2$O in 1 ml. of isopropanol at a temperature of about 55° C. After the addition is complete heat at the same temperature for an additional ¾ hours and allow the reaction mixture to cool to room temperature. Fractionate the reaction mixture at about 185° C./0.01 mm. of mercury to produce a relatively pure product. Infrared and elemental analysis can be used to confirm that the desired product is produced.

Another embodiment of the invention is the preparation of the siloxanecarborane having the formula CH$_3$OSi(CH$_3$)$_2$OSi(CH$_3$)([CH$_2$]$_4$$\theta$CH$_3$ by slowly adding 15 parts by weight of the alkenylcarborane, CH$_2$=CH$_2$CH$_2$CH$_2$$\theta$CH$_3$ to a stirred mixture of 14.5 parts by weight of the siloxane CH$_3$OSi(CH$_3$)$_2$OSi(CH$_3$)(H)OCH$_3$ and 0.2 ml. of a solution of 0.1 g. H$_2$PtCl$_6$·6H$_2$O of isopropanol at a temperature of about 40° C. After the addition is complete heat at the same temperature for an additional two hours and allow the reaction mixture to cool to room temperature. Fractionate the reaction mixture at about 180° C./0.01 mm. of mercury to produce a relatively pure product. Infrared and elemental analysis can be used to confirm that the desired product is produced.

Another embodiment of the invention is the preparation of the siloxanecarborane having the formula C$_2$H$_5$OSi(CH$_3$)$_2$OSi(CH$_3$([CH$_2$]$_4$$\theta$H)OC$_2$H$_5$ by slowly adding 14 parts by weight of the alkenylcarborane, CH$_2$=CHCH$_2$CH$_2$$\theta$H to a stirred mixture of 135 parts by weight of the siloxane, C$_2$H$_5$OSi(CH$_3$)$_2$OSi(CH$_3$)(H)OC$_2$H$_5$ and 0.2 ml. of a solution of 0.1 g. H$_2$PtCl$_6$·6H$_2$O in 1 ml. of isopropanol at a temperature of about 45° C. After the addition is complete heat at the same temperature for an additional two hours and allow the reaction mixture to cool to room temperature. Fractionate the reaction mixture at about 180° C./0.01 mm. of mercury to produce a relatively pure product. Infrared and elemental analysis can be used to confirm that the desired product is produced.

Another embodiment of the invention is the preparation of the siloxanecarborane having the formula n-C$_4$H$_9$OSi(CH$_3$)$_2$OSi)([CH$_2$]$_3$$\theta$H)O—n-C$_4$H$_9$ by slowly adding 14 parts by weight of the alkenylcarborane, CH$_2$=CH$_2$CH$_2$$\theta$H to a stirred mixture of 14 parts by weight of the siloxane n-C$_4$H$_9$OSi(CH$_3$)$_2$OSi(CH$_3$)(H)O—n-C$_4$H$_9$ and 0.2 ml. of a solution of 0.1 g. H$_2$PtCl$_6$·6H$_2$O in 1 ml. of isopropanol at a temperature of about 50° C. After the addition is complete heat at the same temperature for an additional 2 hours and allow the reaction mixture to cool to room temperature. Fractionate the cooled reaction mixture at about 185° C./0.01 mm. of mercury to produce a relatively pure product. Infrared and elemental analysis can be used to confirm that the desired product is produced.

Another embodiment of the invention is the preparation of the siloxanecarborane having the formula ClSi(CH$_3$)$_2$OSi(CH$_3$)$_2$OSi(CH$_3$)([CH$_2$]$_4$$\theta$H)Cl by slowly adding 15 parts by weight of the alkenylcarborane, CH$_2$=CH$_2$—CH$_2$—CH$_2$$\theta$H to a stirred mixture of 21 parts by weight of the siloxane, ClSi(CH$_3$)$_2$OSi(CH$_3$)$_2$OSiCH$_3$(H)Cl and 0.2 ml. of a solution of 0.1 g. H$_2$PtCl$_6$·6H$_2$O in 1 ml. of isopropanol at a temperature of about 50° C. After the addition is complete heat at the same temperature for an additional two hours and allow the reaction mixture to cool to room temperature. Fractionate the cooled reaction mixture at about 200° C./0.02 mm. of mercury to produce a relatively pure product. Infrared and elemental analysis can be used to confirm that the desired product is produced.

Another embodiment of the invention is the preparation of the siloxanecarborane having the formula BrSi(CH$_3$)$_2$OSi(CH$_3$)$_2$OSi(CH$_3$)([CH$_2$]$_4$$\theta$CH$_3$)Br by slowly adding 15 parts by weight of the alkenylcarborane, CH$_2$=CH$_2$—CH$_2$—CH$_2$—$\theta$-CH$_3$ to a stirred mixture of 23 parts by weight of the siloxane, BrSi(CH$_3$)$_2$OSi(CH$_3$)$_2$OSi(CH$_3$)(H)Br and 0.2 ml. of a solution of 0.1 g. H$_2$PtCl$_6$·6H$_2$O of 1 ml. of isopropanol at a temperature of about 55° C. After the addition is complete heat at the same temperature for an additional 2½ hours and allow the reaction mixture to cool to room temperature. Fractionate the cooled reaction mixture at about 195° C./0.02 mm. of mercury to produce a relatively pure product. Infrared and elemental analysis can be used to confirm that the desired product is produced.

Another embodiment of the invention is the preparation of the siloxanecarborane having the formula ClSi(CH$_3$)$_2$OSi(CH$_3$)$_2$OSi(CH$_3$)$_2$OSi(CH$_3$)[(CH$_2$)$_4$$\theta$]Cl by slowly adding 15 parts by weight of the alkenylcarborane, to a stirred mixture of 28 parts by weight of the siloxane, ClSi(CH$_3$)$_2$OSi(CH$_3$)$_2$OSi(CH$_3$)$_2$OSiCH$_3$(H)Cl and 0.2 ml. of a solution of 0.1 g. H$_2$PtCl$_6$·6H$_2$O in 1 ml. of isopropanol at a temperature of about 60° C. After the addition is complete heat at the same temperature for an additional two hours and allow the reaction mixture to cool to room temperature. Fractionate the cooled reaction mixture at about 205° C./0.01 mm. of mercury to produce a relatively pure product. Infrared and elemental analysis can be used to confirm that the desired product is produced.

Another embodiment of the invention is the preparation of the siloxaneneocarborane having the formula ClSi(CH$_3$)$_2$OSi(CH$_3$)([CH$_2$]$_4$⊕—n-C$_4$H$_9$)Cl by slowly adding 15 parts by weight of the alkenylneocarborane, CH$_2$=CH$_2$CH$_2$CH$_2$⊕—n-C$_4$H$_9$ to a stirred mixture of 14.5 parts by weight of the siloxane, ClSi(CH$_3$)$_2$OSi(CH$_3$)(H)Cl and 0.2 ml. of a solution of 0.1 g. H$_2$PtCl$_6$·6H$_2$O in 1 ml. of isopropanol at a temperature of about 40° C. After the addition is complete heat at the same temperature for an additional one hour and allow the reaction mixture to cool to room temperature. Fractionate the reaction mixture at about 180° C./0.02 mm. of mercury to produce a relatively pure product. Infrared and elemental analysis can be used to confirm that the desired product is produced.

Another embodiment of the invention is the preparation of the siloxaneneocarborane having the formula BrSi(C$_2$H$_5$)$_2$OSi(C$_2$H$_5$)([CH$_2$]$_4$⊕—CH$_3$)Br by slowly adding 15 parts by weight of the alkenylneocarborane, CH$_2$=CH$_2$CH$_2$CH$_2$⊕CH$_3$ to a stirred mixture of 14.7 parts by weight of the siloxane, BrSi(C$_2$H$_5$)$_2$OSi(C$_2$H$_5$)(H)Br and 0.2 ml. of a solution of 0.1 g. H$_2$PtCl$_6$·6H$_2$O in 1 ml. of isopropanol at a temperature of about 45° C. After the addition is complete heat at the same temperature for an additional one hour and allow the reaction mixture to cool to room temperature. Fractionate the reaction mixture at about 185° C./0.02 mm. of mercury to produce a relatively pure product. Infrared and elemental analysis can be used to confirm that the desired product is produced.

Another embodiment of the invention is the preparation of the siloxaneneocarborane having the formula ClSi(CH$_3$)$_2$OSi(CH$_3$)([CH$_2$]$_4$⊕-phenyl)Cl by slowly adding 15 parts by weight of the alkenylneocarborane, CH$_2$=CH—CH$_2$—CH$_2$-⊕-phenyl to a stirred mixture of 14.0 parts by weight of the siloxane, ClSi(CH$_3$)$_2$OSi(CH$_3$)(H)Cl and 0.2 ml. of a solution of 0.1 g. H$_2$PtCl$_6$·6H$_2$O in 1 ml. of isopropanol at a temperature of about 55° C. After the addition is complete heat at the same temperature for an additional two hours and allow the reaction mixture to cool to room temperature. Fractionate the reaction mixture at about 200° C./0.01 mm. of mercury to produce a relatively pure product. Infrared and elemental analysis can be used to confirm that the desired product is produced.

Another embodiment of the invention is the preparation of the siloxaneneocarborane having the formula ClSi(CH$_3$)$_2$OSi(CH$_3$)$_2$OSi(CH$_3$)[(CH$_2$)$_4$⊕H]Cl by slowly adding 15 parts by weight of the alkenylneocarborane, CH$_2$=CH$_2$—CH$_2$—CH$_2$⊕H to a stirred mixture of 21 parts by weight of the siloxane, ClSi(CH$_3$)$_2$OSi(CH$_3$)$_2$—OSi(CH$_3$)(H)Cl and 0.2 ml. of a solution of .01 g. H$_2$PtCl$_6$·6H$_2$O in 1 ml. of isopropanol at a temperature of about 55° C. After the addition is complete heat at the same temperature for an additional two hours and allow the reaction mixture to cool to room temperature. Fractionate the cooled reaction mixture at about 225° C./0.02 mm. of mercury to produce a relatively pure product. Infrared and elemental analysis can be used to confirm that the desired product is produced.

Another embodiment of the invention is the preparation of the siloxaneneocarborane having the formula CH$_3$OSi(CH$_3$)$_2$OSi(CH$_3$)([CH$_2$]$_4$⊕H)OCH$_3$ by slowly adding 15 parts by weight of the alkenylneocarborane, CH$_2$=CH$_2$—CH$_2$—CH$_2$⊕H to a stirred mixture of 22 parts by weight of the siloxane, CH$_3$OSi(CH$_3$)$_2$OSi(CH$_3$)$_2$—OSi(CH$_3$)(H)OCH$_3$ and 0.2 ml. of a solution of 0.1 g. H$_2$PtCl$_6$·6H$_2$O in 1 ml. of isopropanol at a temperature of about 55° C. After the addition is complete heat at the same temperature for an additional two hours and allow the reaction mixture to cool to room temperature. Fractionate the cooled reaction mixture at about 205° C./0.02 mm. of mercury to produce a relatively pure product. Infrared and elemental analysis can be used to confirm that the desired product is produced.

Another embodiment of the invention is the preparation of the siloxaneneocarborane having the formula ClSi(CH$_3$)$_2$OSi(CH$_3$)$_2$OSi(CH$_3$)$_2$
OSi(CH$_3$)([CH$_2$]$_4$⊕H)Cl by slowly adding 15 parts by weight of the alkenylneocarborane, CH$_2$=CH$_2$—CH$_2$—CH$_2$⊕H to a stirred mixture of 27 parts by weight of the siloxane, ClSi(CH$_3$)$_2$OSi(CH$_3$)$_2$OSi(CH$_3$)$_2$OSi(CH$_3$)(H)Cl and 0.2 ml. of a solution of 0.1 g. H$_2$PtCl$_6$·6H$_2$O in 1 ml. of isopropanol at a temperature of about 60° C. After the addition is complete heat at the same temperature for an additional two hours and allow the reaction mixture to cool to room temperature. Fractionate the cooled reaction mixture at about 210° C./0.01 mm. of mercury to produce a relatively pure product. Infrared and elemental analysis can be used to confirm that the desired product is produced.

To more clearly set forth the invention an illustrative and detailed example showing the preparation of the siloxane reactant, its transformation into a siloxane-carborane product and two examples showing the preparation of useful polymers from the illustrated product are submitted.

Example 1.—Preparation of 1,1,3-trimethyl-3-(4-carbonanylbutyl)-1,2-dichlorodisiloxane A 100 g. portion of 1,1,3-trimethyldichlorodisiloxane is prepared using the cohydrolysis method of Andrianov et al. described earlier. The intermediate is isolated and purified from the reaction mixture by fractional distillation.

To an appropriate reaction vessel fitted with heating, cooling, stirring and condenser is added a mixture of 14.0 g. (0.071 moles) of 1-butenylcarborane and 0.2 ml. of a solution of 0.1 g. H$_2$PtCl$_6$·6H$_2$O in 1 ml. of isopropyl alcohol. The mixture is heated with stirring to 85° C. At this time a 12.6 g. (0.067 moles) portion of the above siloxane intermediate is slowly added. The reaction proceeds exothermically. After the addition is complete the reaction mixture is further heated at 95° C. for one hour. Fractional distillation of the reaction mixture yields 14.2 g. of a colorless liquid product, B.P. 178° C./0.02 mm. $n_D^{25}$ 1.5082. The material is identified by infrared and elemental analysis.

*Analysis.*—C$_9$H$_{28}$B$_{10}$Cl$_2$ISi$_2$, Calc.: C, 27.89; H, 7.26; Cl, 18.25. Found: C, 27.85; H, 7.32; Cl, 18.07.

Example 2.—Polymerization of the product of Example 1 to a useful polymer

Polymerization of the intermediate is done by procedures commonly used to polymerize dichlorosilanes.

(A) Method 1.—In this instance 1,1,3-trimethyl-3-(4-carboranylbutyl)-1,3 - dichlorosilane (1.67 g., 0.0043 mole) is added to 25 ml. of water being stirred at high speed in an electric blender. The polymerization reaction is immediate with the formation of a soft white solid. The product after being extracted with ether is a colorless, soft plastic, solid, weighing 1.06 g.

(B) Method 2.—In another illustration of a polymerization run, water, 0.38 g. (0.0208 mole) is added dropwise over a three hour period to the above silane 8.07 g. (0.0208 mole) with stirring. The mixture becomes more viscous as the water is added and requires heating to 95°

C. to maintain fluidity. The mixture is heated an additional forty hours. The water, 0.2 g. is added after which heating is continued for three hours. The product is dissolved in benzene; the solution is washed to neutrality with water and dried over Drierite. The benzene solution yields actually two layers. The lower layer had a syrupy consistency and when evaporated yields 4.0 g. of semi-solid polymer of molecular weight 4200. The upper layer produces 1.9 g. of liquid polymer of unknown molecular weight.

As indicated by the numerous embodiments and the above example, numerous changes and modifications can be made in the reaction conditions and reactants without departing from the inventive concept. The scope of the invention is best presented by the claims which follow.

I claim:
1. Novel carborane-silane compositions of the formula

$$A(CH_2)_nZR^1$$

wherein A is a siloxane radical selected from the group consisting of $XSi(R)_2OSi(R)X\text{---}$, $$XSi(R)_2OSi(R)_2OSi(R)X\text{---}$$

and $XSi(R)_2OSi(R)_2OSi(R)_2OSi(R)X\text{---}$, X being selected from the group consisting of chlorine, bromine and the radicals methoxy, ethoxy and n-butoxy, Z is a carborane radical, R and $R^1$ are members of the group consisting of hydrogen, aliphatic and aryl radicals, and $n$ is an integer ranging from 0 up to and including 8.

2. The compositions of claim 1 wherein R is hydrogen.
3. The compositions of claim 1 wherein R is alkyl.
4. The compositions of claim 1 wherein R is aryl.
5. Novel carborane-silane compositions of the formula:

$$A(CH_2)_n\theta R^1$$

wherein A is a siloxane radical selected from the group consisting of: $XSi(R)_2OSi(R)X\text{---}$, $$XSi(R)_2OSi(R)_2OSi(R)X\text{---}$$

and $XSi(R)_2OSi(R)_2OSi(R)_2OSi(R)X\text{---}$, X is selected from the group consisting of chlorine, bromine and the radicals methoxy, ethoxy and n-butoxy, $\theta$ is a carboranyl radical

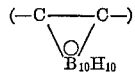

R and $R^1$ are members of the group consisting of hydrogen alkyl and aryl radicals, and $n$ is an integer ranging from 0 up to and including 8.

6. Novel carborane-silane compositions of the formula:

$$A(CH_2)_n\theta R^1$$

wherein A is $XSi(R)_2OSi(R)X$, X is selected from the group consisting of chlorine, bromine and the radicals, methoxy, ethoxy and n-butoxy, $\theta$ is a carboranyl radical

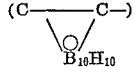

R and $R^1$ are members of the group consisting of hydrogen, alkyl and aryl radicals, and $n$ is an integer ranging from 0 up to and including 8.

7. Novel carborane-silane compositions of the formula:

$$A(CH_2)_n\theta R^1$$

wherein R is $XSi(R)_2OSi(R)_2OSi(R)X\text{---}$, X is selected from the group consisting of chlorine, bromine and the radicals methoxy, ethoxy and n-butoxy, $\theta$ is a carboranyl radical

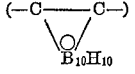

and R and $R^1$ are members of the group consisting of hydrogen, alkyl and aryl radicals, and $n$ is an integer ranging from 0 up to and including 8.

8. Novel carborane-silane compositions of the formula:

$$A(CH_2)_n\theta R^1$$

wherein A is $XSi(R)_2OSi(R)_2OSi(R)_2OSi(R)X\text{---}$, X is selected from the group consisting of chlorine, bromine and the radicals methoxy, ethoxy and n-butoxy, $\theta$ is a carboranyl radical

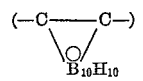

and R and $R^1$ are members of the group consisting of hydrogen, alkyl and aryl radicals, and $n$ is an integer ranging from 0 up to and including 8.

9. Novel carborane-silane compositions of the formula:

$$A(CH_2)_n\theta R^1$$

wherein A is $XSi(R)_2OSi(R)X\text{---}$, X is selected from the group consisting of chlorine, bromine and the radicals methoxy, ethoxy and n-butoxy, $\theta$ is a carboranyl radical

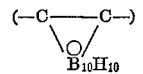

and R and $R^1$ are hydrogen, and $n$ is an integer ranging from 0 up to and including 8.

10. Novel carborane-silane compositions of the formula:

$$A(CH_2)_n\theta R^1$$

wherein A is $XSi(R)_2OSi(R)X\text{---}$, X is selected from the group consisting of chlorine, bromine and the radicals methoxy, ethoxy and n-butoxy, $\theta$ is a carboranyl radical

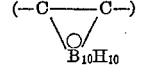

R and $R^1$ are alkyl and $n$ is an integer ranging from 0 up to and including 8.

11. Novel carborane-silane compositions of the formula:

$$A(CH_2)_n\theta R^1$$

wherein A is $XSi(R)_2OSi(R)X\text{---}$, X is selected from the group consisting of chlorine, bromine and the radicals methoxy, ethoxy and n-butoxy, $\theta$ is a carboranyl radical

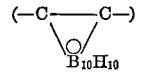

and R is aryl, $R^1$ is alkyl and $n$ is an integer ranging from 0 up to and including 8.

12. Novel carborane-silane compositions of the formula:

$$A(CH_2)_n\theta R^1$$

wherein A is $XSi(R)_2OSi(R)_2OSi(R)X\text{---}$, X is selected from the group consisting of chlorine, bromine and the radicals methoxy, ethoxy and n-butoxy, $\theta$ is a carboranyl radical

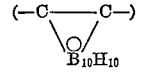

and R is hydrogen, $R^1$ is alkyl and $n$ is an integer ranging from 0 up to and including 8.

13. Novel carborane-silane compositions of the formula:

$$A(CH_2)_n\theta R^1$$

wherein A is $XSi(R)_2OSi(R)_2OSi(R)X\text{---}$, X is selected from the group consisting of chlorine, bromine and the radicals methoxy, ethoxy and n-butoxy, $\theta$ is a carboranyl radical

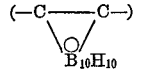

R is alkyl, $R^1$ is hydrogen and $n$ is an integer ranging from 0 up to and including 8.

14. Novel carborane-silane compositions of the formula:

$$A(CH_2)_n\theta R^1$$

wherein A is $XSi(R)_2OSi(R)_2OSi(R)X$—, X is selected from the group consisting of chlorine, bromine and the radicals methoxy, ethoxy and n-butoxy, $\theta$ is a carboranyl radical

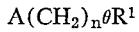

and R is aryl, $R^1$ is alkyl and $n$ is an integer ranging from 0 up to and including 8.

15. Novel carborane-silane compositions of the formula:

$$A(CH_2)_n\theta R^1$$

wherein A is $XSi(R)_2OSi(R)_2OSi(R)_2OSi(R)X$—, X is selected from the group consisting of chlorine, bromine and the radicals methoxy, ethoxy and n-butoxy, $\theta$ is a carboranyl radical

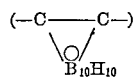

R is hydrogen, $R^1$ is alkyl and $n$ is an integer ranging from 0 up to and including 8.

16. Novel carborane-silane compositions of the formula:

$$A(CH_2)_n\theta R^1$$

wherein A is $XSi(R)_2OSi(R)_2OSi(R)_2OSi(R)X$—, X is selected from the group consisting of chlorine, bromine and the radicals methoxy, ethoxy and n-butoxy, $\theta$ is a carboranyl radical

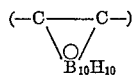

R is aryl, $R^1$ is aryl and $n$ is an integer ranging from 0 up to and including 8.

17. Novel carborane-silane compositions of the formula:

$$A(CH_2)_n\theta R^1$$

wherein A is $XSi(R)_2OSi(R)_2OSi(R)_2OSi(R)X$—, X is selected from the group consisting of chlorine, bromine and the radicals methoxy, ethoxy and n-butoxy, $\theta$ is a carboranyl radical

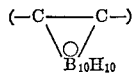

R is aryl, $R^1$ is alkyl and $n$ is an integer ranging from 0 up to and including 8.

18. Novel carborane-silane compositions of the formula:

$$A(CH_2)_n\oplus R^1$$

wherein A is a siloxane radical selected from the group consisting of: $XSi(R)_2OSi(R)X$—, $XSi(R)_2OSi(R)_2OSi(R)X$— and $XSi(R)_2OSi(R)_2OSi(R)_2OSi(R)X$—, X is selected from the group consisting of chlorine, bromine and the radicals methoxy, ethoxy and n-butoxy, $\oplus$ is a neocarboranyl radical, R and $R^1$ are members of the group consisting of hydrogen, alkyl and aryl radicals, and $n$ is an integer ranging from 0 up to and including 8.

19. Novel carborane-silane compositions of the formula:

$$A(CH_2)_n\oplus R^1$$

wherein A is $XSi(R)_2OSi(R)X$—, X is selected from the group consisting of chlorine, bromine and the radicals methoxy, ethoxy and n-butoxy, $\oplus$ is a neocarboranyl radical, R and $R^1$ are members of the group consisting of hydrogen, alkyl and aryl radicals, and $n$ is an integer ranging from 0 up to and including 8.

20. Novel carborane-silane compositions of the formula:

$$A(CH_2)_n\oplus R^1$$

wherein A is $XSi(R)_2OSi(R)_2OSi(R)X$—, X is selected from the group consisting of chlorine, bromine and the radicals methoxy, ethoxy and n-butoxy, $\oplus$ is a neocarboranyl radical, R and $R^1$ are members of the group consisting of hydrogen, alkyl and aryl radicals, and $n$ is an integer ranging from 0 up to and including 8.

21. Novel carborane-silane compositions of the formula:

$$A(CH_2)_n\oplus R^1$$

wherein A is $XSi(R)_2OSi(R)_2OSi(R)_2OSi(R)X$—, X is selected from the group consisting of chlorine, bromine and the radicals methoxy, ethoxy and n-butoxy, $\oplus$ is a neocarboranyl radical, R $R^1$ are members of the group consisting of hydrogen, alkyl and aryl radicals, and $n$ is an integer ranging from 0 up to and including 8.

22. $ClSi(CH_3)_2OSi(CH_3)([CH_2]_4\theta H)Cl$, wherein $\theta$ is a carboranyl radical

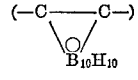

23. $ClSi(C_2H_5)_2OSi(C_2H_5)([CH_2]_5\theta$ phenyl$)Cl$, wherein $\theta$ is a carboranyl radical

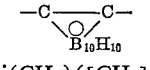

24. $ClSi(CH_3)_2OSi(CH_3)([CH_2]_4\theta CH_3)$ $Cl$, wherein $\theta$ is a carboranyl radical

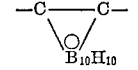

25. $ClSi(CH_3)_2OSi(CH_3)([CH_2]_3\oplus H)Cl$, wherein $\oplus$ is a neocarboranyl radical.

References Cited
UNITED STATES PATENTS

| | | |
|---|---|---|
| 2,823,218 | 2/1958 | Speier et al. |
| 3,137,719 | 6/1964 | Papetti. |
| 3,321,505 | 5/1967 | Fein et al. _____ 260—606.5 XR |

TOBIAS E. LEVOW, *Primary Examiner.*

PAUL F. SHAVER, *Assistant Examiner.*

U.S. Cl. X.R.

260—46.5, 606.5